(12) United States Patent
Reid (10) Patent No.: US 7,978,873 B2
(45) Date of Patent: Jul. 12, 2011

(54) DEVICES FOR DISPLAYING MODAL PATTERNS

(75) Inventor: John Reid, St. John's In The Vale Cumbria (GB)

(73) Assignee: Sonic Age Ltd., Newcastle (GB)

( * ) Notice: Subject to any disclaimer, the term of this patent is extended or adjusted under 35 U.S.C. 154(b) by 579 days.

(21) Appl. No.: 12/083,912

(22) PCT Filed: Oct. 20, 2006

(86) PCT No.: PCT/GB2006/003917
§ 371 (c)(1),
(2), (4) Date: Sep. 19, 2008

(87) PCT Pub. No.: WO2007/045898
PCT Pub. Date: Apr. 26, 2007

(65) Prior Publication Data
US 2009/0141904 A1    Jun. 4, 2009

Related U.S. Application Data

(60) Provisional application No. 60/728,798, filed on Oct. 21, 2005.

(30) Foreign Application Priority Data

Oct. 20, 2005 (GB) .................................. 0521372.3

(51) Int. Cl.
*H04R 1/02* (2006.01)
*H04R 29/00* (2006.01)
(52) U.S. Cl. .......................................... 381/431; 381/59
(58) Field of Classification Search .................... 381/59, 381/140, 150, 173, 408, 431; 181/141, 167; 367/140
See application file for complete search history.

(56) References Cited

U.S. PATENT DOCUMENTS 2,782,632 A * 2/1957 Grimm et al. ................... 73/582
3,407,897 A 10/1968 Hans

FOREIGN PATENT DOCUMENTS

| DE | 89 05 349 | 6/1989 |
| FR | 1 565 390 | 5/1969 |
| GB | 2 404 779 | 2/2005 |
| WO | 2005/015523 | 2/2005 |

OTHER PUBLICATIONS

International Search Report for PCT/GB2006/003917 mailed Jan. 4, 2007.
British Search Report dated Dec. 1, 2005, issued in connection with British Application No. GB0521372.3.

* cited by examiner

*Primary Examiner* — Brian Ensey
(74) *Attorney, Agent, or Firm* — Nixon & Vanderhye P.C.

(57) ABSTRACT

The present invention provides an acoustic display device for displaying modal patterns in response to sound from a sound source. The display device (10) has a substantially circular housing (12), which housing (12) includes a continuous curved side wall (13a), a substantially flat base wall (13b), and open end (13c). The open end (13c) is closed by diaphragm (14), thereby forming closed chamber (15). Excitation of the diaphragm can be effected by introducing vocal sounds to the underside of the diaphragm via one of a plurality of sound connecting means (22) that include a flexible tubular section (30), which terminates in a mouthpiece (32). A user can place the mouthpiece over their mouth and nose and make vocal sounds, which are delivered to the interior of the chamber (15). The mouthpiece (32) can be substituted with a sound collector (60) having a "horn" shape and an annular flange for engagement with a loudspeaker. The other ends (24) of the sound connecting means (22), within the closed chamber (15), each contain a non-return valve so that pressure within the chamber is maintained. The device can also include weight locating means (21a, 21b, 21c) or magnetic tensioning means (80, 84) for tuning the diaphragm. Removable covers having different markings can assist in analysing the patterns produced. Two or more integral curved spirit levels (38) in conjunction with adjustable feet (40) enable accurate levelling of the diaphragm.

22 Claims, 7 Drawing Sheets

DEVICES FOR DISPLAYING MODAL PATTERNS

This application is the U.S. national phase of International Application No. PCT/GB2006/003917 filed 20 Oct. 2006 which designated the U.S. and claims priority to British Patent Application No. 0521372.3 filed 20 Oct. 2005 and U.S. Provisional Application No. 60/728,798 filed 21 Oct. 2005, the entire contents of each of which are hereby incorporated by reference.

This invention relates to acoustic devices for creating patterns of particulate matter, such patterns being indicative of the sonic structure inherent within the sound source being coupled to the device.

It is a well-established theory that the inherent harmonic structure of a sound vibration can be rendered visible by exciting particulate matter on a diaphragm to create a pattern associated with that sound vibration.

In 1785, E F P Chladni discovered modal phenomenon by exciting a brass plate carrying sand using a violin bow, resulting in the formation of sound patterns caused by the various modal flexions of the plate at the plate's natural frequencies of vibration (modal patterns).

More recently, devices for displaying modal patterns have been described, in U.S. Pat. No. 3,407,897 and GB2404779.

In U.S. Pat. No. 3,407,897, an acoustic device, that is to say having no electro-acoustic component, consists of an open-type body across which a membrane strewn with particles is tensioned. A pipe, attached to the bottom of the body, is the means by which voice sounds can be directed to the underside of the membrane, thus exciting the membrane and creating patterns in the particulate matter which are indicative of the sonic structure of the voice sounds. This patent also describes an electro-acoustic device whereby the membrane can be excited by a loudspeaker, with the pipe still connecting the interior of the body to the outside.

GB2404779 describes an improved device in which the hollow interior of the body is closed (i.e. there is no pipe connecting the interior with the air outside the device). This arrangement produces improved modal patterns which do not suffer from the colouration effects exhibited by the devices of U.S. Pat. No. 3,407,897. The closed arrangement is similar to the "infinite baffle" system commonly used in loudspeaker enclosures.

The present inventor has noted that the closed arrangement of GB2404779 has the disadvantage that a user cannot directly introduce voice sounds into the device, in the same way that can be done with the device of U.S. Pat. No. 3,407, 897. Nevertheless, the present inventor has also noted that the closed arrangement of the device of GB2404779 provides improved or more accurate archetypal modal patterns, as a result of the "infinite baffle" arrangement.

At its most general, the first part of the present invention proposes that an acoustic device for displaying modal patterns and having a closed or "infinite baffle" interior should be provided with a port or conduit through which sounds can be delivered from outside the device to the interior and that the advantages of the closed arrangement can be maintained by providing a valve in the conduit to maintain the internal pressure.

Accordingly, in a first aspect the present invention provides an acoustic device for displaying modal patterns, the device having a housing and a diaphragm extending across the housing to define a closed chamber, the arrangement being such that when a mass of particular matter is located on the diaphragm, excitation of the diaphragm by a sound source creates a pattern in the particular matter thereon indicative of at least one property of the sound produced by the sound source, and at least one sound connecting means providing an air flow path between the closed chamber and the outside of the device, wherein valve means are associated with the or each sound connecting means, said valve means having a closed position in which air flow out of the chamber is not possible through the valve means and an open position in which air flow into the chamber is possible through the valve means.

Preferably in the closed position a reduction in the pressure in the closed chamber is not possible. Preferably in the open position an increase in the pressure in the closed chamber is possible.

Suitably the valve is normally in the closed position. Preferably a change from the closed position to the open position can occur when the external pressure is greater than the internal pressure in the chamber, e.g. when voice sounds are being delivered through the sound connecting means.

Suitably the or each sound connecting means (hereinafter "the sound connecting means") include an opening in the housing, e.g. a port, orifice or hole extending through the housing, through which sound can pass into the chamber.

Preferably, the valve means are located in the sound connecting means, e.g. within the port, orifice or hole.

By providing a combination of a sound connecting means (e.g. a tube or channel) which connects the interior of the "closed" chamber (i.e. substantially air tight) to the outside of the chamber and a valve that prevents airflow out of the chamber, suitably in its normal "rest" position, the present invention provides a device whereby a user can introduce sound (e.g. voice sounds) into the device whilst maintaining the advantages of the closed chamber arrangement.

Suitably the closed chamber is a substantially air tight chamber and preferably the valve means provide a substantially air tight seal in the closed position.

Preferably the valve is a non-return valve, for example a gravity operated valve. For example, such a valve may move to the closed "rest" position under the action of gravity, thereby maintaining internal pressure in the device. The present inventor has found a gravity operated valve to be particularly effective, with the additional advantage that the "closed" position is maintained without the need for additional components such as springs.

In certain embodiments the valve includes a resilient member, preferably a rubber member, for example a rubber flap, that moves between the closed and open positions. Suitably it is biased to the closed position. The rubber member preferably seals the sound transferring means in its closed position. The present inventor has found such a resilient member to be particularly useful because not only can it provide a bias to the closed position, but can also provide an efficient seal.

Preferably the device includes two or more sound connecting means so that two or more users can use the device at the same time. For example, each user can deliver voice sounds into the respective sound connecting means so as to create modal patterns that are indicative of the combined sound structure, or the users could take it in turns to deliver voice sounds, in which case the valves in respective sound connecting means maintain the internal pressure whilst one of the users is not using the device. For example, bass, tenor, alto and soprano, as well as combinations thereof can be studied.

Preferably there are two, more preferably three, and most preferably four sound connecting means (e.g. ports or channels), so that two, three or four users can use the device at the same time. In an arrangement where there are four sound connecting means suitably each sound connecting means has associated with it a non-return valve, each of which acts to prevent loss of pressure in the chamber when that particular sound connecting means is not in use, such as when one of the users takes a breath. For example, if channel (sound connecting means) 1 is in use to feed voice sounds into the chamber of the device, then corresponding valve 1 will be "open" (i.e. in the open position) to permit air flow into the chamber, and full internal pressure is maintained because valves in channels 2, 3, and 4 (the second, third and fourth sound connecting means) act to prevent the internal pressure from escaping i.e. they are in the "closed" position. In another possible scenario channels 1 and 2 are in use (i.e. voice sounds are being delivered to the chamber via those channels) and the pressures from both voices maintain a positive internal pressure in the chamber, whilst the valves in channels 3 and 4 prevent loss of this pressure.

The at least one property of the sound from the sound source referred to in this specification may include the frequency, frequency distribution, harmonics, harmonic content, etc. Preferably the pattern created on the diaphragm is indicative of more than one property of the sound. Suitably the pattern is indicative of the sonic structure inherent within the sound from the sound source.

Preferably the sound connecting means includes a tubular section. Suitably at least part of the tubular section extends through the housing.

Preferably the sound connecting means include an external member that extends from the housing e.g. so that sound from a sound source some distance from the device can be directed into the chamber. Preferably the external member includes a tubular section. The external member may be fixed to the rest of the sound connecting means (e.g. formed as a unitary piece) or it may be removably attached, e.g. via a removable connector, e.g. a threaded connector or friction, interference or compression fit.

Preferably the sound connecting means have a sound source engaging end, suitably adapted to be placed adjacent or against a sound source. For example, the sound source engaging end may include a mouthpiece into which a user can sing or talk. Preferably the mouthpiece is adapted to cover the mouth and nose of a user. The sound source engaging end may also be shaped or adapted so that it can be placed adjacent to or against a loudspeaker, for example, as described below in relation to the eight and ninth aspects.

Preferably the external member of the sound transferring means includes a tubular section that extends from the housing and terminates at a sound source engaging end. The length of the external member can be selected so that users can sit or stand a comfortable distance from the device when using the device. For example, a length in the range 50 cm to 150 cm is preferred. A corresponding increase in internal diameter is preferred as the length increases. For example, a tube of 50 cm length will, typically, have an internal diameter of not less than 25 mm whereas a tube of 150 cm will, typically, have an internal diameter of not less than 50 mm. Preferably the external member is flexible, for example a flexible tube or hose. Preferably it is made from a plastics material. The external member may include a corrugated section, to aid flexibility. Preferably the corrugated section is located adjacent the sound source engaging end.

Where there are two or more (e.g. four) sound connecting means it is preferred that they are spaced equally around the housing. Preferably the housing has a circular cross-section and in this case it is preferred that the sound connecting means are spaced equally around the circumference of the housing.

The sound connecting means (suitably including an external member) may be formed as a unitary body with the housing, e.g. moulded as a single piece. Alternatively, at least part of the sound connecting means, in particular the external member thereof, are formed separately from the housing and are fixed or attached thereto. In arrangements wherein at least a part of the sound connecting means is not formed as a unitary or integral part of the housing it is preferred that an airtight seal is provided between the sound connecting means and the housing.

Preferably the sound connecting means includes an internal member that extends inside the chamber, preferably to deliver the sound to a central region of the chamber. Preferably the internal member includes an upturned end inside the chamber so that sound can be directed at the diaphragm. In particularly preferred embodiments the upturned end has associated with it a gravity-operated valve, for example a valve having a rubber flap that closes the sound connecting means under the action of gravity.

Suitably the device includes pressure regulating means for regulating the maximum pressure within the device. For example, this may comprise a port or orifice in the housing, e.g. in a side wall of the housing. The cross-sectional area of the port can be selected so as to permit a certain controlled leakage of pressure from the device, whilst retaining the advantages of an infinite baffle arrangement. The pressure regulating means therefore preferably prevents undesirably high pressure building up within the device.

Preferably the housing is rigid. It is also preferred that in embodiments where the sound transferring means includes a tubular or pipe section extending through the housing, the tubular or pipe section that extends through the housing is rigid. It is also preferred that in the case where there is an internal member, the internal member is rigid. This helps to avoid colouration of the sound due to resonance effects associated with non-rigid components. As discussed above, it is preferred that at least a part of the external member of the sound connecting means is flexible.

The diaphragm may comprise a tensioned sheet of elastic material such as PVC or latex extending across the housing, the tension in which sheet may be pre-set and/or may be adjustable (e.g. as described below).

Suitably the device includes a mass of particulate matter located on the diaphragm.

The particulate matter is typically sized between 250 and 1000 microns, and may be, for example, crushed quartz crystal or proprietary micro glass spheres or table salt or sugar.

In certain embodiments of the invention there may comprise means for projecting the patterns in the particulate matter onto a viewing panel external of the housing.

The means for projecting the pattern may comprise a source of light within the hollow interior of the housing, preferably 'cold light' from one or more Light Emitting Diodes, a lens, preferably a flat fresnel lens, below the diaphragm, and a focusing lens above the diaphragm, the diaphragm being transparent.

The present invention also includes any combination of the first aspect with one or more of any of the further aspects described herein, including optional and preferred features thereof.

Tuning

The present inventor has also noted the importance of correctly tuning the diaphragm and noted that the comparatively mechanical tuning mechanisms suggested in U.S. Pat. No. 3,407,897 and GB2404779 may not provide sufficient sensitivity or control over the tuning and can be undesirably complicated in a device which is likely to be used by children, including young children. The present inventor has also noted that these mechanical arrangements can be expensive to implement.

In a second part of the present invention it is proposed that the diaphragm of a device for displaying modal patterns can be tuned by applying pre-selected weights or masses to particular locations around the edge of the diaphragm so that the force exerted on the diaphragm by the action of gravity on the weights or masses provides the desired tension to the diaphragm.

Accordingly, the second aspect of the present invention provides a method of tuning a diaphragm in an apparatus for displaying modal patterns in which apparatus the diaphragm can be excited by a sound source so that patterns are created in particulate matter located on the diaphragm, which patterns are indicative of at least one property of the sound produced by the sound source, the method including the steps of applying one or more masses to the apparatus so that the weight means are associated with the diaphragm at one or more of a plurality of circumferentially spaced locations around the diaphragm, whereby the weight exerted by the weight means stretches the diaphragm.

Suitably the weight means are selected to provide the desired tension in the diaphragm.

This method avoids the need to provide a complicated mechanical arrangement e.g. of threaded members and wing nuts (as disclosed in U.S. Pat. No. 3,408,897) or tensioning rods and wires (see GB2404779).

The term "tuning the diaphragm" as used herein is intended to mean adjusting or controlling the diaphragm's response to a sound source, i.e. the way in which it moves, oscillates or vibrates in response to a sound source. Typically this means either increasing the tension in the diaphragm (so that it becomes tauter) or reducing the tension in the diaphragm (so that it becomes less taut).

The weight means can be conventional "weights" such as those used with e.g. scales and balances, or any other weight (mass) that can be applied to the apparatus so as to exert a force on the diaphragm, for example, by the introduction of sand or water into suitable receptacles.

The user can adjust the tension in a diaphragm at a given point around the edge of the diaphragm by applying a weight means (or changing the size of the weight means) to that part of the diaphragm. The user would readily understand that larger masses provide greater tension in the diaphragm and this intuitive relationship would aid the accurate tuning of the diaphragm.

Preferably the method includes applying one or more weights to the device so that the weights are associated with the diaphragm at least two locations around the circumference of the diaphragm. Suitably these locations are equally spaced around the diaphragm. More preferably one or more weights are applied to at least four, more preferably at least six, more preferably at least eight, more preferably at least ten, and most preferably at least twelve locations spaced around the diaphragm. By applying weights to a larger number of points around the diaphragm the tension within the diaphragm can be controlled more evenly and precisely, thereby enabling the production of modal patterns that more accurately reflect the sonic structure inherent within the sound source.

Suitably the device includes a plurality of different weight means and the method includes the step of selecting an appropriate weight means for each of the locations around the diaphragm.

Preferably the device includes weight locating means, e.g. one or more recesses or compartments, to which the weight means can be applied. Suitably the method includes the step of applying one or more weight means to such weight locating means.

Preferably the method includes the step of applying a first weight means and a second weight means to the device, wherein the first weight means has a different mass from the second weight means.

Preferably the method includes the steps of applying a tuning sound source (e.g. a particular note) to the diaphragm and adjusting the tension in the diaphragm by means of adjusting (changing) the weight means applied to the diaphragm, so that the pattern formed on the diaphragm matches a predetermined tuning pattern associated with the tuning sound source. For example, the predetermined tuning pattern can be provided as part of a set of tuning instructions. Preferably the method includes a step of applying an initial tuning tension to the diaphragm prior to applying the tuning sound source. The tuning sound source may be introduced into the chamber via a sound collector as defined herein, for example an exponentially-shaped collecting horn, the sound source being a loudspeaker which is fed with an audio signal, for example from any proprietary amplifier/signal storage source.

Preferably the method includes tuning the diaphragm at a predetermined temperature and barometric pressure, to ensure optimum and consistent results. A preferred temperature is about 20° C. A preferred barometric pressure is about 1010 millibars. Similarly, the tuning could be carried out at these conditions if the diaphragm were to be replaced or refitted.

It is envisaged that the device may include instructions for tuning at different temperatures and/or different barometric pressures, for example instructions may include a table indicating to the user the weights/masses and their locations around the diaphragm that should be used to tune the diaphragm at a given temperature and/or barometric pressure. Accordingly, the method preferably includes the step of applying one or more weights to the diaphragm in accordance with such written instructions. The method may also include measuring the ambient temperature and/or ambient barometric pressure. Preferably the tuning is then carried out as a function of the measured values.

Suitably the device includes a housing and the diaphragm extends across the housing to define a chamber, preferably a closed chamber.

Preferably the diaphragm is held or sandwiched between two annuli. Suitably one of the annuli is moveable with respect to the other annulus, which movement adjusts the clamping or gripping force on the diaphragm, which in turn changes the tension in the diaphragm. Preferably the method includes the step of applying one or more weight means to the moveable annulus so as to adjust the tension in the diaphragm. Preferably weight locating means are provided on the moveable annulus.

Figure 1:
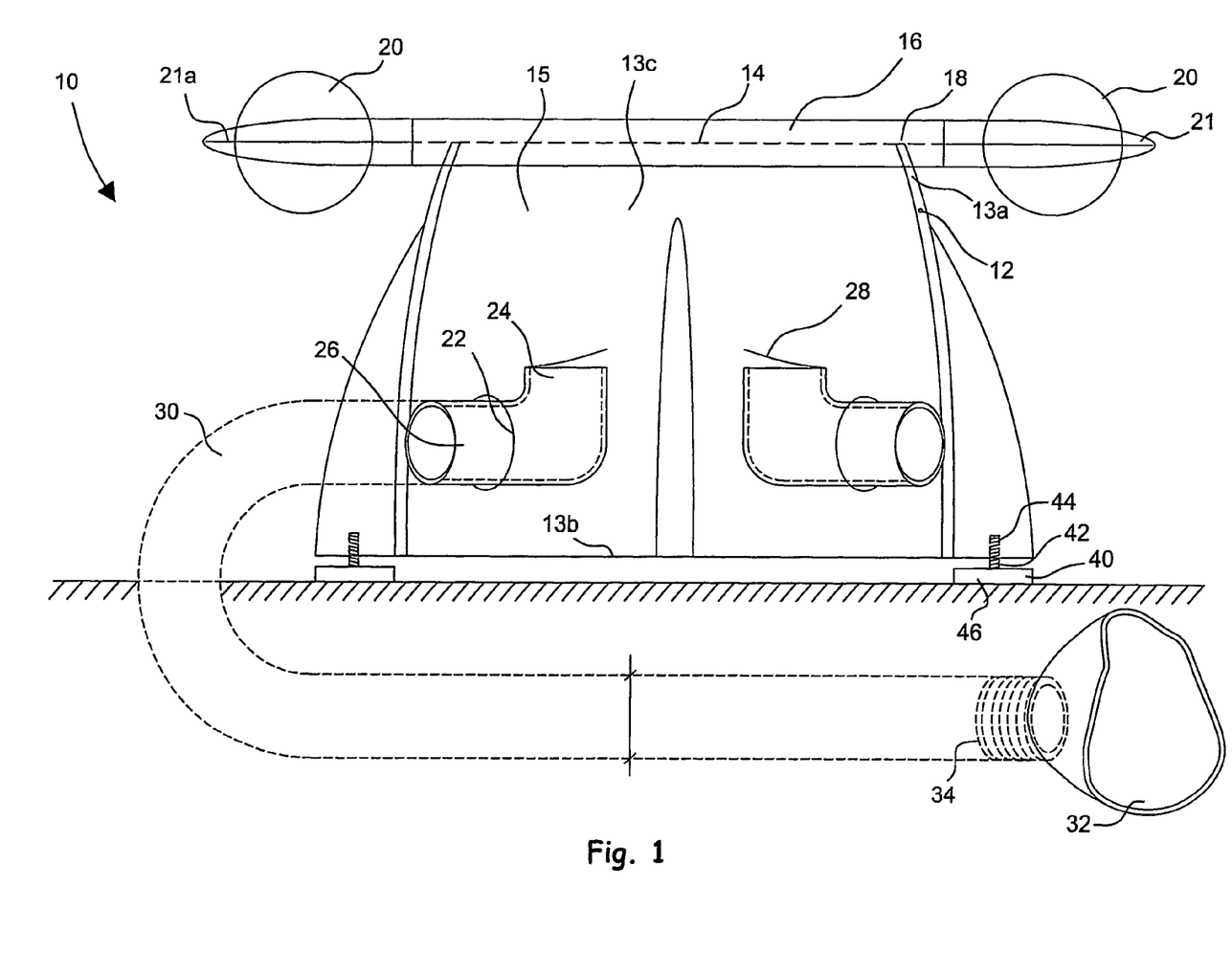
FIG. 1 is a side view of an acoustic device, being a first embodiment of the present invention.

The diaphragm can be connected to or supported on the housing by the annuli. However, in preferred embodiments the diaphragm (preferably held between the two annuli) is supported directly on the housing. In other words, the diaphragm is in contact with, i.e. rests on, the housing. In such arrangements it is preferred that the housing includes an upper edge section (suitably an annular edge section) on which the diaphragm is supported. Preferably the method includes the step of applying one or more weight means to the device (e.g. to the annuli holding the diaphragm) so as to adjust the downward force of the diaphragm on the housing, thereby controlling the tension in the diaphragm. An example of this arrangement is shown in FIG. 1.

Preferably the method includes the step of applying a sound source to the diaphragm to generate a modal pattern in the particulate matter on the diaphragm.

In a third aspect, related to the second aspect, the present invention provides an acoustic device for displaying modal patterns, the device having a housing and a diaphragm extending across the housing to define a chamber, the arrangement being such that when a mass of particulate matter is located on the diaphragm excitation of the diaphragm by a sound source creates a pattern in the particulate matter indicative of at least one property of the sound produced by the sound source, wherein the device includes a plurality of weight locating means to which one or more weights can be applied, the weight locating means being associated with the diaphragm at circumferentially spaced locations around the diaphragm, whereby the tension in the diaphragm can be adjusted to tune the diaphragm's response to the sound source by applying selected weights to one or more of the weight locating means.

The weight locating means are preferably shaped to accommodate correspondingly shaped weights/masses. Preferably they restrict the movement (specifically translational movement) of the weights. It is particularly preferred that they retain the weights such that in normal use movement of the centre of gravity of the weights with respect to the diaphragm is restricted, preferably prevented. The weight locating means may comprise a recess, aperture or compartment for accommodating a weight or weights. Preferably the weight locating means include a recess, suitably a substantially hemi-spherical recess. Suitably spherical masses can be accommodated therein. Preferably such recesses have a diameter in the range 5 mm to 60 mm, and most preferably 5 mm to 40 mm.

Preferably the device includes at least four, more preferably at least eight, and most preferably at least twelve weight locating means. Suitably the majority of the weight locating means are recesses, e.g. shaped to retain the weights. It is preferred that at least some of the weight locating means are curved. Preferably the weight locating means are curved recesses that have a length in the range 2.5 to 7.5 cm and a width of 0.5 to 1.0 cm. In certain embodiments the recesses are substantially hemi-spherical recesses.

Preferably the plurality of weight locating means include a first set of weight locating means, e.g. recesses, that are different from a second set of weight locating means, e.g. recesses. Preferably at least one set of the weight locating means are curved. Preferably each of the weight locating means in the first set is larger than each of the weight locating means in the second set. Preferably the first set each have a dimension, e.g. a diameter, in the range 20 mm to 40 mm. Preferably the second set each have a smaller size, e.g. smaller diameter, for example less than about 10 mm. Preferably there are more weight locating means in the second set than in the first set. In this way tuning of the diaphragm can be achieved by applying larger weights (bigger masses) to some or all of the first set of weight locating means (which can therefore produce a significant increase in diaphragm tension) and then fine-tuning the diaphragm tension by applying smaller weights to some or all of the second set of weight locating means.

In preferred embodiments the diaphragm is held between upper and lower annuli. Suitably movement of one of the annuli with respect to the other causes a change in the tension of the diaphragm. The annulus can therefore be moved for the purpose of providing a neutral tension to the diaphragm, e.g. following fitting of a new diaphragm. Preferably the weight locating means are provided in one or both of the annuli. This arrangement means that by applying selected weights to the weight locating means (e.g. hemi-circular recesses), the annuli can be pulled downwards to control the tension in the diaphragm. By applying appropriate weights to the weight locating means spaced around the circumference of the diaphragm (e.g. connected to the movable annulus at circumferentially spaced locations) the distribution of tension in the diaphragm can be controlled.

Preferably the device includes a set of weights (masses), from which an appropriate selection can be made for each attachment point. Preferably the weights have a shape that corresponds to the shape of the weight locating means (e.g. recess). Preferably the weights are curved, e.g. an arc of a circle, or spherical. The curved weights are preferably 2.5 to 7.5 cm in length and 0.5 to 1.0 cm wide. In certain embodiments the weights include particulate-filled weights or fluid- (e.g. water-) filled weights (e.g. spherical weights), for example comprising a shell or outer skin defining an interior volume, which interior volume is at least partially filled with fluid or a mass of particulates, preferably sand. The amount of fluid or particulates, e.g. sand, may be different as between one weight and another, to provide a range of different masses with which to tune the diaphragm.

Suitably the weights include a first set having a larger size, e.g. larger diameter, than a second set. Preferably the first set includes fluid-filled (preferably water-filled) masses or particulate-filled masses as defined above. Typically, the first set of weights would be in the range 35 g to 500 g, depending on the diameter of the membrane being tensioned; smaller membranes requiring less tension than larger membranes. Suitably the first set of weights would be spherical. Preferably the second set of weights includes solid metal masses, preferably of shape which would be unlikely to be swallowed by small children, for example, tubular-section shapes with curved profiles on plan view. Typically the second set of weights would be in the range 10 g to 30 g. Suitably the shape and dimensions of the weights correspond to the shape and sizes of the weight locating means defined above.

Preferably some or all of the weight locating means include a bearing so that the weights can be moved, e.g. rotated, when accommodated in the weight locating means.

Preferably the device is provided as a kit comprising the acoustic device. Preferably the kit also includes one or more of the following: one or more flexible input tubes and mouth pieces; a sound collecting horn; a sound signal reference library, for example, a Compact Disc; a removable transparent cover and instructions for tuning the diaphragm. Suitably the instructions comprise a list of weight locating means and the desired weight for each weight locating means so that reproducible tuning can be achieved. Preferably the housing and/or weight locating means are marked so that each weight locating means can be individually identified.

The optional and preferred features discussed in association with the second aspect also apply to the third aspect. Similarly, the optional and preferred features of the third aspect may also apply to the second aspect.

In a further part of the present invention it is proposed that the diaphragm of an acoustic device for displaying modal patterns can be tuned by using magnets to exert a force on one or more tensioning means associated with a part of the diaphragm so that tension can be applied to that part of the diaphragm as a function of the magnetic force applied to the tensioning means.

Accordingly, in a fourth aspect the present invention provides a method of tuning a diaphragm in an acoustic device in which the diaphragm can be excited by a sound source so that patterns are created in particulate matter located on the diaphragm which patterns are indicative of at least one property of the sound produced by the sound source, the method including the step of applying a tensioning force to the diaphragm by applying a magnetic force to a tensioning member, which tensioning member is associated with the diaphragm.

Preferably the method includes the step of controlling the tensioning force by adjusting the magnetic force.

An advantage of controlling a tensioning force by using magnets is that the magnitude of the tensioning force can be controlled by simply adjusting the distance between the magnet and the tensioning means associated with the diaphragm, or by controlling the strength of the magnetic field produced by the magnet.

Preferably, the step of controlling the size of the tensioning force includes changing the distance between the magnet and the tensioning member associated with the diaphragm (i.e. moving them further apart or closer together).

Typically the tensioning member includes a magnet but it may alternatively or additionally include a member that is attracted to the magnet (e.g. at its simplest an iron-containing member).

Preferably the device includes magnet locating means for holding the magnet at a desired distance from the tensioning means, in which case the method preferably includes the step of moving the magnet within the magnet locating means. Furthermore, the apparatus may include magnet locking means for fixing the magnet at a desired location, in which case the method preferably includes the step of locking or fixing the magnet at a selected position.

Suitably, the tensioning means includes a magnet, in which case the poles of the tensioning means magnet are arranged so that opposing poles are in facing arrangement, e.g. the north pole of the tensioning means faces the south pole of the magnet or the south pole of the tensioning means magnet faces the north pole of the magnet. It follows that the method preferably includes the step of bringing the north and south poles closer together to increase the tension applied to the diaphragm and/or the step of moving the north and south poles further apart to decrease the tension applied to the diaphragm.

According to a fifth aspect, related to the fourth aspect, the present invention provides an acoustic device for displaying modal patterns the device having a housing and a diaphragm extending across the housing to define a chamber, the arrangement being such that when a mass of particulate matter is located on the diaphragm, excitation of the diaphragm by a sound source creates a pattern in the particulate matter indicative of at least one property of the sound produced by the sound source, wherein the device further includes tensioning means associated with the diaphragm and at least one magnet associated with the housing, wherein the tensioning force applied to the diaphragm by the tensioning means can be adjusted by adjusting the magnetic force exerted on the tensioning means by the magnet.

Preferably the device includes a plurality of tensioning means. Suitably the magnetic tensioning means are associated with the diaphragm at circumferentially spaced locations, preferably equally spaced locations. Preferably there are a corresponding number of magnets.

Preferably the tensioning means are magnetic, or include a magnet, to increase the potential attraction between the tensioning means and magnet.

Preferably the device includes at least three, more preferably four, more preferably at least six, tensioning means and corresponding magnets.

Suitably the diaphragm is held between upper and lower annuli and movement of one of the annuli with respect to the other causes a change in the tension in the diaphragm. The annulus can therefore be moved for the purpose of providing a neutral tension, for example following changing the diaphragm. Suitably the tensioning means (e.g. magnets) are attached to the twin annulus assembly (preferably to the underside thereof) so that an increased magnetic force experienced by the tensioning means causes it to pull downwards on the annulus, thereby increasing the tension at that particular point of the diaphragm.

Preferably the housing includes magnet locating means for accommodating the magnets. Preferably these magnet locating means are integral with the housing. Suitably, they permit the magnets to be moved towards and away from the tensioning means so as to adjust the attractive force and hence the tensioning force applied to the diaphragm. Preferably they restrict the movement of the magnets in other directions, thereby maintaining the selected attractive force.

Preferably the magnet locating means include magnet locking means to hold the magnet in the selected place. This may prevent inadvertent movement of the magnet, for example when the device is moved or knocked.

Preferably the device is provided as a kit comprising the acoustic device. Preferably the kit also includes one or more of the following: one or more flexible tubes and mouthpieces; a sound collecting horn, a sound signal reference library, for example a Compact Disc; a removable transparent cover and instructions for tuning the diaphragm. Suitably the instructions comprise a list of the tensioning means/magnets and the desired spacing between each set of tensioning means and magnet so that reproduceable tuning can be achieved. Suitably, the housing and/or tensioning means is marked so that each pair of tensioning means and magnet can be individually identified. Preferably the instructions include appropriate references to the marked tensioning means/magnets.

The optional and preferred features discussed above in respect of the fourth aspect may also apply to the fifth aspect. Similarly, the optional and preferred features discussed in this fifth aspect may also apply to the fourth aspect.

Spirit Level

The present inventor has noted the importance of ensuring that the diaphragm is level and also found difficulties in trying to measure the level of the diaphragm by simply using a traditional spirit level, for example because of its imposed weight.

In a further part of the present invention it is proposed that more accurate measurement of the level of the diaphragm can be achieved by providing the device with a curved spirit level.

Accordingly, in a sixth aspect the present invention provides an acoustic device for displaying modal patterns, the device having a housing and a diaphragm extending across the housing to define a chamber, the arrangement being such that when a mass of particulate matter is located on the diaphragm excitation of the diaphragm by a sound source creates a pattern in the particulate matter indicative of at least one property of the sound produced by the sound source, wherein the device includes at least two spirit levels, each spirit level having a curved shape.

By providing at least two curved spirit levels it is preferably possible for the user to detect when the diaphragm is displaced from a level position in either of two directions. Preferably the two curved spirit levels are arranged at 90-degrees to each other. Suitably this enables the curved spirit levels to detect unwanted displacement of the diaphragm when it is tilted in either of two perpendicular directions, typically the forward-backward or left-right directions.

Furthermore by providing curved spirit levels that are preferably integral with the device, there is no need for the user to apply a discrete spirit level or other suitable measuring device to the apparatus and the potential errors associated with correct placement of such a separate device are thereby avoided.

Preferably each spirit level is located on the upper surface of the device so that they are visible when viewing the diaphragm. Preferably the spirit levels are contained in a recess so that they do not protrude above the surface of the housing. This helps prevent damage to the spirit levels.

Preferably there are at least three, more preferably four curved spirit levels, suitably equally spaced around the housing. The present inventor has found that more accurate levelling of the diaphragm can be achieved with four curved spirit levels equally spaced in this way. Improved levelling can result in modal patterns which are more clearly and evenly defined.

Preferably the curvature of each spirit level is that of an arc of a circle whose centre is coaxial with the centre of the diaphragm.

Preferably the housing includes adjustment means for adjusting the level of the diaphragm. Preferably such adjusting means adjust the level of the entire device and the diaphragm is fixed in this regard with respect to the housing. Preferably the adjustment means includes a threaded portion in threaded engagement with the housing (e.g. with a threaded bore) and a moveable member that can be rotated to turn the threaded portion to move the threaded portion so that it can be moved into and out of the housing to provide a desired spacing between the moveable member and the housing.

Suitably the adjusting means include one or more adjustable feet attached to the housing. Preferably there are at least two, preferably at least three, for example three or four such adjustable feet. The user can therefore readily adjust the level of the diaphragm whilst checking the level on the curved spirit levels. Preferably each adjustment means is circumferentially aligned with a corresponding spirit level, for example located vertically below a corresponding spirit level.

Multilayer Diaphragm

The present inventor has noted that the sensitivity of diaphragms used in known devices for displaying modal patterns can be limited in certain circumstances. In particular, the present inventor has noted that it can be difficult to adjust the response of a diaphragm to a given sound frequency without affecting, sometimes negatively affecting, the diaphragm's response to a different sound frequency.

In a further part of the present invention it is proposed that the diaphragm should include at least two layers. In this way, the properties and performance of the diaphragm can be adjusted not only by controlling the parameters of size and thickness of each layer, but also by changing the nature of the materials or substances used to form each layer.

Accordingly, in a sixth aspect the present invention provides an acoustic device for displaying modal patterns, the device having a housing and a diaphragm extending across the housing to define a chamber, the arrangement being such that when a mass of particulate matter is located on the diaphragm, excitation of the diaphragm by a sound source creates a pattern in the particulate matter indicative of at least one property of the sound produced by the sound source, wherein the diaphragm includes at least two layers.

Preferably the two layers are formed of different material. One of the layers can be a fluid.

The present inventor has found that different combinations of layers have a different response to a sound source and that this provides a whole new dimension to the control of the patterns produced by the diaphragm.

Preferably the diaphragm includes three layers, to further increase the number of possible combinations of material. In a particularly preferred embodiment the material of the first and third layers (i.e. the outer layers) of a three-layer diaphragm are the same and the inner layer is different.

Preferably the outer layers are elastic membranes, for example PVC membranes, or other plastics material.

Preferably the second or inner layer is a fluid layer held between the inner and outer layers. Suitably the fluid is water or alcohol, or mixtures thereof.

The thickness of the fluid layer is preferably in the range 0.1 mm to 0.3 mm.

Suitably the fluid layer is held between the two layers by virtue of side members which extend between the outer layers. Preferably the fluid is sealed between the two outer layers. Suitably the two outer layers are sealed together along respective circumferential portion. Preferably sealing is achieved by using an adhesive, more preferably by heat welding the two outer layers together.

The present inventor has found that a three-layer diaphragm wherein the central layer is a fluid held between the outer layers has greater sensitivity to certain frequencies. For example, greater sensitivity to higher frequencies has been noted, which may be useful when studying the structure of bird sound, bat sound or dolphin sound.

Suitably the fluid, or mixture of fluids, is selected as a function of the specific gravity of the fluid or fluids and the sensitivity of the diaphragm can be adjusted by selecting appropriate specific gravities, typically in the range 0.75 to 1.5.

The present invention also provides a multi-layer diaphragm for use with an apparatus as defined herein, wherein the diaphragm includes at least two elastic layers and at least one fluid layer, wherein the fluid layer is located between respective elastic layers. Preferred properties of the diaphragm are as defined above.

Removable Cover

The present inventor has noted that the study of the modal patterns produced in response to a sound source may be enhanced if some sort of measurement of the size and location of the patterns produced on the diaphragm can be made. This could be achieved by photographing or recording the patterns produced and then subsequently analysing them but the present inventor has noted that this may not be possible with simple devices and younger users. It can also be expensive.

In a further part of the present invention it is proposed that a device for displaying modal patterns is provided with a removable transparent cover for placement over the diaphragm wherein the removable cover includes markings to assist the visual determination of the properties such as size, form and location of patterns produced on the diaphragm.

According, in a seventh aspect the present invention provides an acoustic device for displaying modal patterns, the device having a housing and a diaphragm extending across the housing to define a chamber, the arrangement being such that when a mass of particulate matter is located on the diaphragm, excitation of the diaphragm by a sound source creates a pattern in the particulate matter indicative of at least one property of the sound produced by the sound source, wherein the device includes a removable transparent cover that is locatable over the diaphragm, through which the diaphragm can be viewed, the removable cover having integral markings which are superimposed on the diaphragm when viewed by the user.

The markings may comprise graticules or reticles to assist a user to quantify the patterns produced. For example, the markings may comprise geometric markings, for example markings that divide the area of the diaphragm up into sections.

For example, in certain embodiments the markings may include 360° segments (i.e. similar to the markings found on a protractor). Another example is that of a series of concentric rings, which would allow the patterns to be studied more easily for their inherent sonic structures.

Preferably the apparatus is supplied with two or more such removable transparent covers, so that they can be interchanged by a user. Suitably, the markings on each of the removable covers are different.

The present invention also includes such removable transparent covers for use with devices as described above. Preferably the transparent covers are supplied as a set of at least two, preferably at least three such covers. Suitably, each cover in the set has different respective markings.

Sound Collector

The present inventor has noted that it can be difficult to deliver a sound to a device for displaying modal patterns when the sound source producing the sound is large, for example a loudspeaker. For example, whilst a mouth piece (being made to fit a user's face) as described herein can be used to collect vocal sounds made by a user, it may not be large enough to collect sound from, for example, a loudspeaker.

In a further part of the present invention it is proposed that a device for displaying modal patterns is provided with a sound collector that can be connected to an inlet of the device so that sound produced by an external sound source can be directed to the inlet and into the device.

Accordingly, in an eighth aspect the present invention provides an acoustic device for displaying modal patterns, the device having a housing and a diaphragm extending across the housing to define a chamber, the arrangement being such that when a mass of particulate matter is located on the diaphragm, excitation of the diaphragm by a sound source creates a pattern in the particulate matter indicative of at least one property of the sound produced by the sound source, wherein the device includes a removable sound collector for delivering the sound to the chamber, the sound collector having a connector end for connection to the device and a collector end for placement adjacent a sound source.

With this arrangement the sound from a "remote" sound source such as a loudspeaker can be collected and directed into the device. This is particularly useful in circumstances where the sound source, e.g. a loudspeaker, is large and it is desirable to collect as much of the output from the sound source as possible.

The sound collector can also be used to collect sound from live musical instruments, for example by placing it over the "f" hole of a cello. The sound collector may also be placed over a loudspeaker so that when pre-recorded sounds are played through the loudspeaker the resulting patterns can be viewed on the diaphragm. It is then possible to view sound patterns from recorded sounds such as animal sounds, recorded musical instrument sounds and from many other categories of recorded music.

Preferably the connector end includes a compression-fit portion, suitably for connection to an inlet tube on the device.

Preferably the collector end includes a flange, preferably an annular flange, for abutment with a sound source, especially a loudspeaker.

Preferably the collector end is adapted to be placed against or over a loudspeaker. In preferred embodiments the collector end includes at least one engagement means for engaging with the loudspeaker. Preferably the or each engagement means are for engagement with corresponding speaker engagement means associated with the loudspeaker. For example, the engagement means on the collector end may include magnets. Preferably the collector end includes at least 2, more preferably at least 3 and most preferably at least 4 engaging means (e.g. magnets). Suitably, these magnets can be attached to magnets provided on a loudspeaker (e.g. spaced around the edge of the loudspeaker). The magnets on the loudspeaker can be attached to the speaker by an adhesive, for example an adhesive pad. Preferably the magnets are embedded in a pad. Suitably the magnets (e.g. in the form of, or embedded in, pads) can be removed from the loudspeaker without damaging the speaker. For example, the adhesive is preferably a releasable adhesive.

Suitably the engagement means are located on the flange of the collector end. This helps provide a stable connection between the sound collector and the loudspeaker.

Suitably the collector end has a larger diameter than the connector end. For example, the collector end can have a diameter in the range 10 cm to 50 cm, preferably 25 cm to 35 cm. Suitably, the connector end has a diameter in the range 5 mm to 20 cm, preferably 1 cm to 5 cm, more preferably 2 cm to 4 cm, especially about 2.5 cm. Preferably the connector end is adapted to connect to the external portion of the sound connecting means described in relation to the first aspect, for example via a compression fit.

Preferably the sound collector includes a tubular portion connecting the respective connecting and collecting ends. Preferably the tubular section is rigid, for example made from a plastics material. Alternatively or additionally some or all of the tubular section may be flexible. Preferably the tubular section has a diameter that decreases from the collector end to the connector end. Suitably the tubular section has a curved shape, to help direct and focus the sound to the connecting end. Preferably at least some of the length of the tubular section has a profile (in the longitudinal direction, i.e. looking side on) that is an exponential function of the length of that part of the tubular section. The present inventor has found that a curved profile, suitably an exponentially-curved profile, helps to direct and focus the sound towards the connector end.

In certain embodiments the sound collector may have a "horn" or "trumpet" shape.

Preferably, the acoustic device is as described in the first aspect, i.e. includes sound connecting means. Preferably the sound collector of this aspect is the sound source engaging end of the sound connecting means.

In a ninth aspect the present invention includes a sound collector as defined herein, for use with a device according to any one of the aspects described herein.

The sound collectors of this aspect are particularly useful when used in combination with the device according to the first aspect. Suitably, the connector end of the sound collector can be connected to the sound connecting means of the device of the first aspect, e.g. to the external portion thereof.

Sonic Vortices

The present inventor has discovered that by applying a small volume of water or alcohol to the top surface of the diaphragm, then sprinkling fine glitter or other particulate onto the fluid's surface it becomes possible to observe patterns, for example sonic vortices and wave trains in the movement of the glitter, when sound is made into one or more of the device's flexible tubes.

Accordingly, in a tenth aspect, the present invention includes a method of producing patterns on a diaphragm, which patterns are produced in response to excitation of the diaphragm by sound produced by a sound source, the method including the steps of covering at least part of an upper surface of the diaphragm with a combination of fluid and a mass of particulates, and exciting the diaphragm with the sound source.

Preferably the fluid is water, alcohol or a mixture thereof. Suitably the amount of fluid added is in the range 5 to 10 ml.

Preferably the particulates are coloured and/or reflective, e.g. glitter. Suitably the particulates have a small enough mass not to penetrate the surface tension of the fluid.

In an eleventh aspect the present invention includes an acoustic device for displaying modal patterns, the device having a housing and a diaphragm extending across the housing to define a chamber, the arrangement being such that when a mass of particulate matter is located on the diaphragm, excitation of the diaphragm by a sound source creates a pattern in the particulate matter indicative of at least one property of the sound produced by the sound source, wherein the device includes a fluid located on at least part of an upper surface of the diaphragm.

Preferably particulates are located on or in the fluid. Suitably the particulates are coloured and/or reflective to make them more visible to the user. Preferably the particulates are made from a plastics material. An example of the particulates is "glitter", which is known to the skilled reader. The size of the particulates can be the same as the mass of particulate matter discussed in relation to the other aspects of the invention.

Any one of the aspects of the present invention described herein may be used in combination with one or more of the other aspects described herein and the present invention includes any or all such combinations. Similarly, the preferred and optional features described in relation to any one of the aspects may be used in combination with any of the optional and preferred features described in relation to any of the other aspects.

BRIEF DESCRIPTION OF THE FIGURES

By way of example only, embodiments in the invention will now be described in greater detail with reference to the accompanying drawings of which.

DETAILED DESCRIPTION

Several of the aspects of the present invention are illustrated in the embodiment shown in the drawings. This has been done for convenience and is not intended to limit the invention to any particular combination of features.

Nevertheless, as noted above, the various aspects of the present invention may be combined, as can the various options and preferred features of each of the aspects. The embodiments illustrated in the figures are examples of such a combination.

Figure 2:
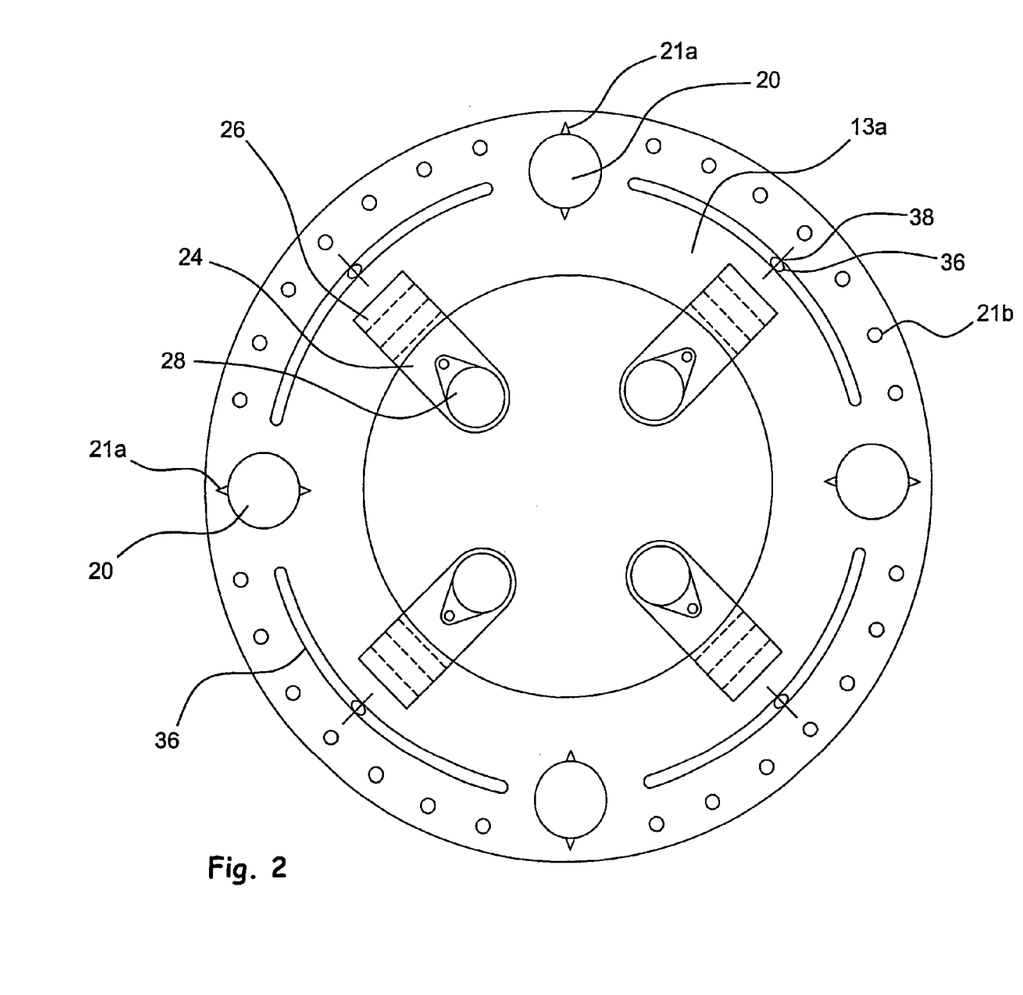
FIG. 2 is a plan view of the device of FIG. 1.

FIGS. 1 and 2 show a modal pattern display device 10 having a substantially circular housing 12. The housing 12 includes a continuous curved side wall 13a, a substantially flat base wall 13b, and open end 13c. The open end 13c is closed by diaphragm 14, thereby forming closed chamber 15.

The diaphragm 14 is held by two-part annulus 16, which comprises an upper and lower annulus that "sandwich" the diaphragm. Although not illustrated in the figures, the upper annulus is moveable with respect to the lower annulus so as to control the gripping force applied to the diaphragm.

The diaphragm 14 rests (i.e. is supported on) the upper end 18 of the side wall 13a. This upper end 18 has an annular or ring shape. The weight of the diaphragm 14 and two-part annulus 16 causes some deformation of diaphragm 14 as it rests on the annular housing upper end 18.

The weight of the diaphragm 14 and two-part annulus 16 can therefore be used to control the extent or degree of deformation of the diaphragm 14. Specifically, a greater downwards force causes greater deformation and hence greater tension within the diaphragm. The device 10 includes weight locating means 21a and 21b provided in the two-part annulus 16. The weight locating means 21a are each shaped to receive a spherical mass 20. Specifically, the weight locating means 21a retain the spherical masses 20 such that the masses extend above and below the two-part annulus 16. They substantially prevent the centre of the masses from moving with respect to the diaphragm (but can permit e.g. rotation of the spherical masses with the mass locating means). The weight of masses 20 acting on the diaphragm cause increased deformation of the diaphragm 14 as a result of the increased downward pressure of the diaphragm on the housing upper end 18. The mass size (e.g. 35 g for smaller devices to 500 g for larger devices) of each mass can be selected so as to control the tension in the diaphragm.

The device includes four weight locating means 21a, which are spaced equally around the circumference of the two-part annulus 16. The device may include less or more such weight locating means, for example two, six, eight, ten or twelve such weight locating means.

The masses 20 have a spherical shape (but other shapes are possible) and are at least partially filled with fluid (e.g. water) or sand or other particulate matter. The extent of filling of each spherical mass 20 can be used to control the size of the force exerted on the diaphragm by that mass. Thus, each mass 20 can be swapped for another mass having similar spherical dimensions but a different degree of internal filling. This provides another way in which the tension in the diaphragm can be controlled.

The weight locating means 21a includes bearings, for example plastic bearings, that permit the spherical masses 20 to rotate within the weight locating means.

The device 10 also includes a second set of weight locating means 21b. These weight locating means 21b are more numerous than the first set 21a. They are also smaller, i.e. of smaller proportions. Unlike the first set 21a, the second set 21b comprise recesses or indents in the upper part of the two-part annulus 16. In other words, weight locating means 21b do not extend all the way through the two-part annulus, and therefore do not permit a mass to extend both above and below the two part annulus 16.

The smaller second group of weight locating means 21b have a curved shape for accommodating curve-shaped masses (other shapes are possible). In the embodiment shown in FIGS. 1 and 2, the curved shape recesses are substantially hemi-spherical and can accommodate similarly shaped masses. The shape of the masses and hence the weight receiving means can be selected to make the masses difficult to swallow by young children. One (but possibly more, e.g. two or more) of these curved mass locating means 21b is located between each of the larger first mass locating means 21a. By adding or removing small curve-shaped masses to some or all of the second set of mass locating means 21*b*, the tension in the diaphragm can be fine-tuned.

The housing 12, specifically the side wall 13*a*, includes sound connecting means 22, which enable the interior of the closed chamber 15 to communicate with the outside. Specifically, they allow sound to be introduced into the closed chamber. The sound connecting means include a tubular section that passes through the side wall 13*a* and comprises an inner upturned section 24 and an outer tubular section 26. The inner upturned section 24 has associated with it a non-return valve. The non-return valve includes a rubber flap 28, for example a silicone rubber flap, which controls the flow of air into and out of the closed chamber 15. The rubber flap 28 seals the end of the inner upturned section 24 in its "rest" or closed position so that the pressure within the closed chamber 15 is maintained. When sound is introduced into the sound connecting means 22, e.g. by a user making vocal sound into the sound connecting means, the rubber flap 28 will be moved out of sealing contact with the end of the inner section 24 because of the increased pressure within the sound connecting means, which pressure will be greater than the internal pressure of the closed chamber 15.

The device 10 includes four sound connecting means 22 spaced equally around the circumference of the housing 12. Each sound connecting means 22 has associated with it a rubber flap 28 that operates as discussed above. Thus, when only one of the sound connecting means 22 is being used (i.e. sound is being delivered through the sound connecting means 22) only one of the rubber flaps 28 (the one associated with the sound connecting means 22 that is being used) will open, and the others will remain shut so as to maintain the pressure within the closed chamber 15. The present inventor has found that this arrangement, specifically the ability to maintain the internal pressure of the closed chamber when sound is being delivered to the chamber, enables the device to produce modal patterns that are more accurate representations of the properties of the sound. Indeed, the use of valves such as the non-return valve 28 enables the closed chamber 15 to act as an "infinite baffle", similar to the arrangements found in loudspeaker cabinets. The present inventor has found this arrangement reduces colouration of the sound, and hence the modal patterns produced. Moreover, the non-return valves 28 provide considerable advantages if more than one user sings into device. The present inventor has found that a substantial loss of internal pressure in the chamber 15 can occur with an open valve arrangement, resulting in insufficient excitation of the membrane during times when e.g. the second, third or fourth user pauses to take a breath. That is, during breath pauses of any of the users, pressure in the chamber is lost through the open valve of the user who has breath-paused. The non-return valve therefore permits the device to show modal patterns of more than one user, without loss of internal pressure. A "tuned" port in the sidewall of the housing can be provided to allow some of the positive pressure within the device to be released in a controlled manner.

At least one of the sound connector means 22 includes an outer tubular section that comprises a flexible section 30. This flexible section may take the form of a sound collector as described hereinbefore and may be removably connected to the sound connector means 22. Alternatively, as shown in FIG. 1 the flexible section 30 is a continuation of the outer tubular section 26. The tubular section 30 has an internal diameter of about 25 mm, which has been found to be desirable for lengths of flexible sections in the order of 50 cm. Other internal diameters are possible, for example in the range 20 mm to 50 mm. The distal or collector end of the tubular section 30 includes a mouthpiece 32. The mouthpiece is made of a plastics material. The mouthpiece is shaped so that it can be placed over the mouth and nose of a user. The present inventor has found that covering both the mouth and nose is advantageous because more of the sound is collected, and hence directed into the closed chamber 15, and also that the "closed" arrangement of the chamber can be extended to the user's own respiratory system. Thus, the mouthpiece 32 is preferably shaped so that it can be placed in sealing engagement with the user's mouth and nose.

The tubular section 30 comprises a corrugated section 34 adjacent the mouthpiece 32, to improve flexibility and comfort. The corrugated section may also be present at other parts of the tubular section.

The device 10 also includes four curved spirit levels 38. These spirit levels are located in the upper surface of the two-part annulus 16. They are equally spaced around the circumference of the annulus. Furthermore, the curve of each spirit level is that of an arc of a circle whose centre point is the same as the centre of the diaphragm. The present inventor has found that four such spirit levels provide the user with a very accurate indication of the level and stability of the diaphragm. It enables the user to ensure that the diaphragm is more level than would otherwise be possible. The "concentric" arrangement of the curvature of the spirit levels and the diaphragm provides further sensitivity in the measurement of the position of the diaphragm, and hence control of that level.

Each spirit level 36 includes a centrally located graticule or marking to indicate where the bubble in the spirit level should be located when the diaphragm is level.

In order to assist the user in levelling the diaphragm, the device 10 includes adjustment means 40. In this embodiment, the adjustment means take the form of adjustable feet located at four points on the underside of: the housing 12. Each of the adjustable feet 40 is located at a point on the circumference of the device that corresponds to the central or mid-point of one of the spirit levels 36.

Each of the adjustment means 40 includes a threaded portion 42, which is in threaded engagement with a threaded recess 44 in the housing 12. The threaded portion 42 can be moved into and out of the recess 44 by rotating movable member 46 that is fixed with respect to the threaded portion 42. The movable member 46 also acts as the contact point between the device and the surface on which it is placed.

Figure 3:
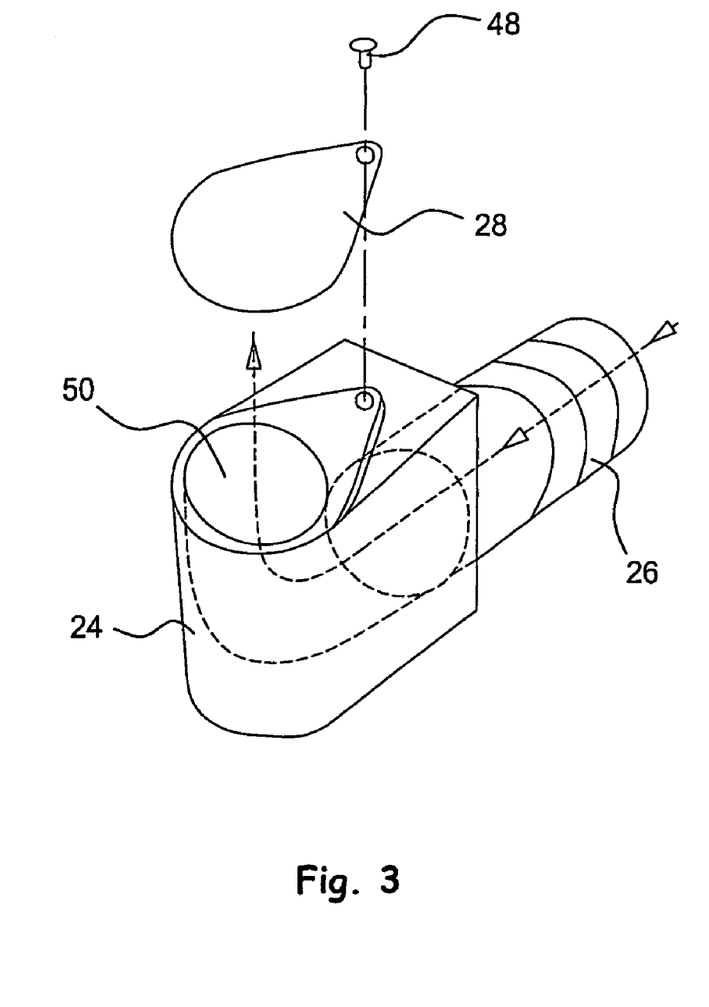
FIG. 3 is an exploded drawing of the valve arrangement from the device of FIGS. 1 and 2.

FIG. 3 shows an exploded diagram of the inner upturned section of the sound connecting means 22 and the associated non-return valve. The rubber flap 28 is shaped so that it covers the orifice at the end of the inner upturned section 24 when in its "closed" position. It is fixed to the inner upturned section 24 by a fixing stud 48. Alternative fixing means are possible.

When there is air flow in the direction indicated by arrow 50 through the outer tube section 26 and inner upturned section 24 the rubber flap 28 can move away from its sealing "closed" position so as to permit sound to enter the closed chamber and excite the diaphragm.

Figure 4:
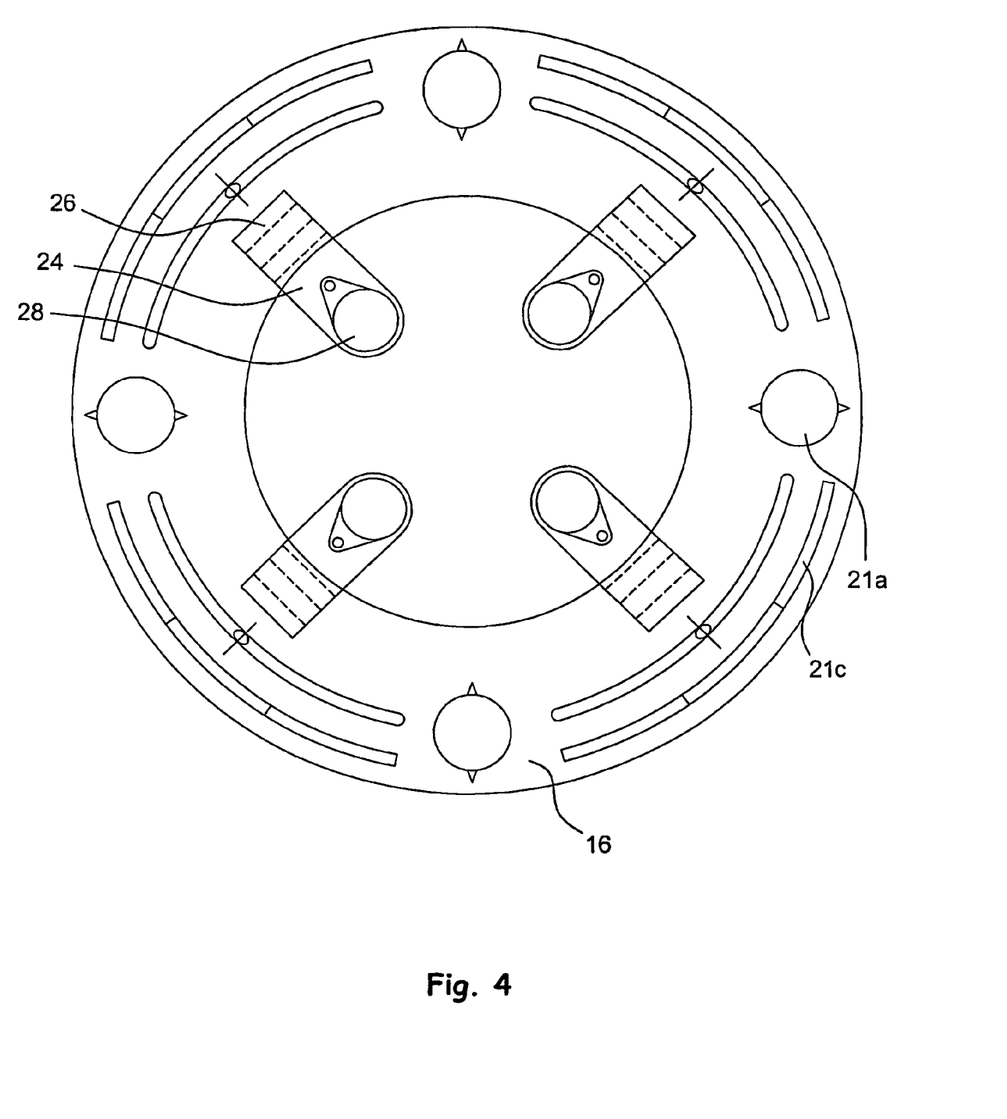
FIG. 4 is a plan view of a second embodiment of the present invention.

FIG. 4 shows an alternative embodiment of a device of the present invention, in which the weight locating means are curved recesses 21*c* located toward the outer periphery of the annulus. Specifically, the curved recesses are arranged in groups of three and are located between the first set of larger weight locating means 21*a*.

The curved weight locating recesses 21*c* can accommodate curved weights. The weight locating means and the corresponding curvature of the weights are preferably an arc of a circle whose centre point is the same as the centre of the diaphragm.

In this embodiment the curved weights are about 5 cm long and 0.6 cm wide. A curved shape can make it less likely that a young child, i.e. a typical user of this device, would swallow the weights.

Figures 5A, 5B:
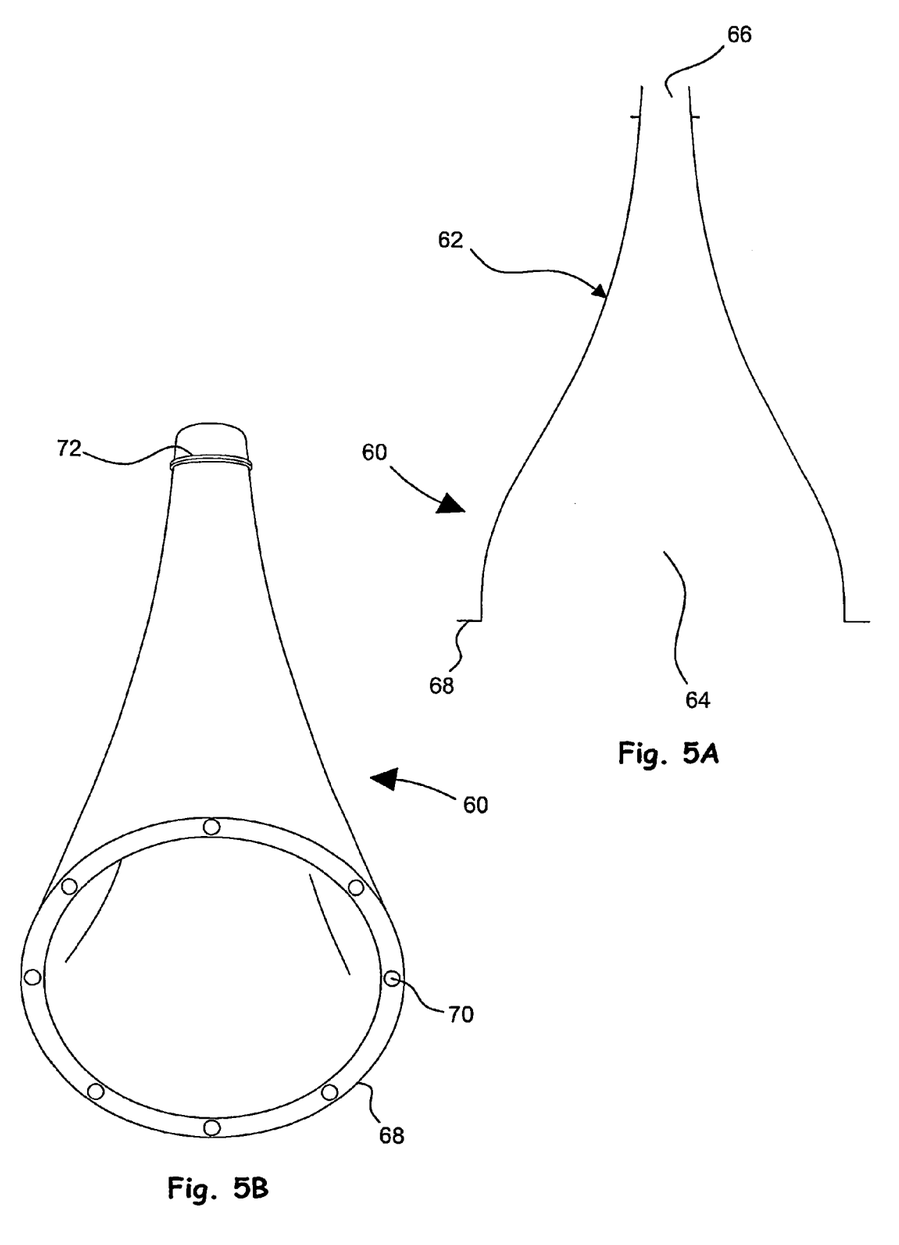
FIGS. 5A and 5B show a sound collector.

FIGS. 5A and 5B show a sound collector 60 that can be attached to a loudspeaker so that sound from the loudspeaker can be directed into the device of the present invention.

The sound collector 60 includes a tubular portion 62 that has a diameter that decreases from the loudspeaker engaging end 64 to the connector end 66. The diameter of the loudspeaker engaging end is about 160 mm, although larger and smaller diameters are possible (e.g. to fit different sized loudspeakers). The diameter of the connecting end is about 25 mm, although larger and smaller diameters are possible. The connector end can be joined to the end of the external portion of the sound connecting means 22 of the acoustic device 10 described herein, for example it can be joined to the flexible or corrugated portion of the sound connecting means. Indeed, the mouthpiece 32 and the sound collector 60 can be interchangeable, so that a user can either introduce vocal sounds into the device or direct sounds from a loudspeaker into the device.

The profile of the tubular section is like that of a "horn" or "trumpet". The curvature of the tubular portion can include a longitudinal section whose diameter changes as an exponential function of the length of the tubular portion. Other curvatures such as a spherical curvature are possible.

The loudspeaker engaging end 64 includes an annular flange 68 for engagement with the loudspeaker. In this embodiment the flange is about 12 mm wide, although other widths are possible.

Several engaging means 70 are located on the flange 68. The engaging means include magnets that are fixed to the flange 68. These magnets, eight of which are present in this embodiment, are spaced equally around the flange.

The magnets 70 engage with corresponding speaker engaging means located on the speaker. For example, magnets similar to magnets 70 are located on the loudspeaker, so that the sound collector is held against the loudspeaker by magnetic attraction during use.

Figure 6:
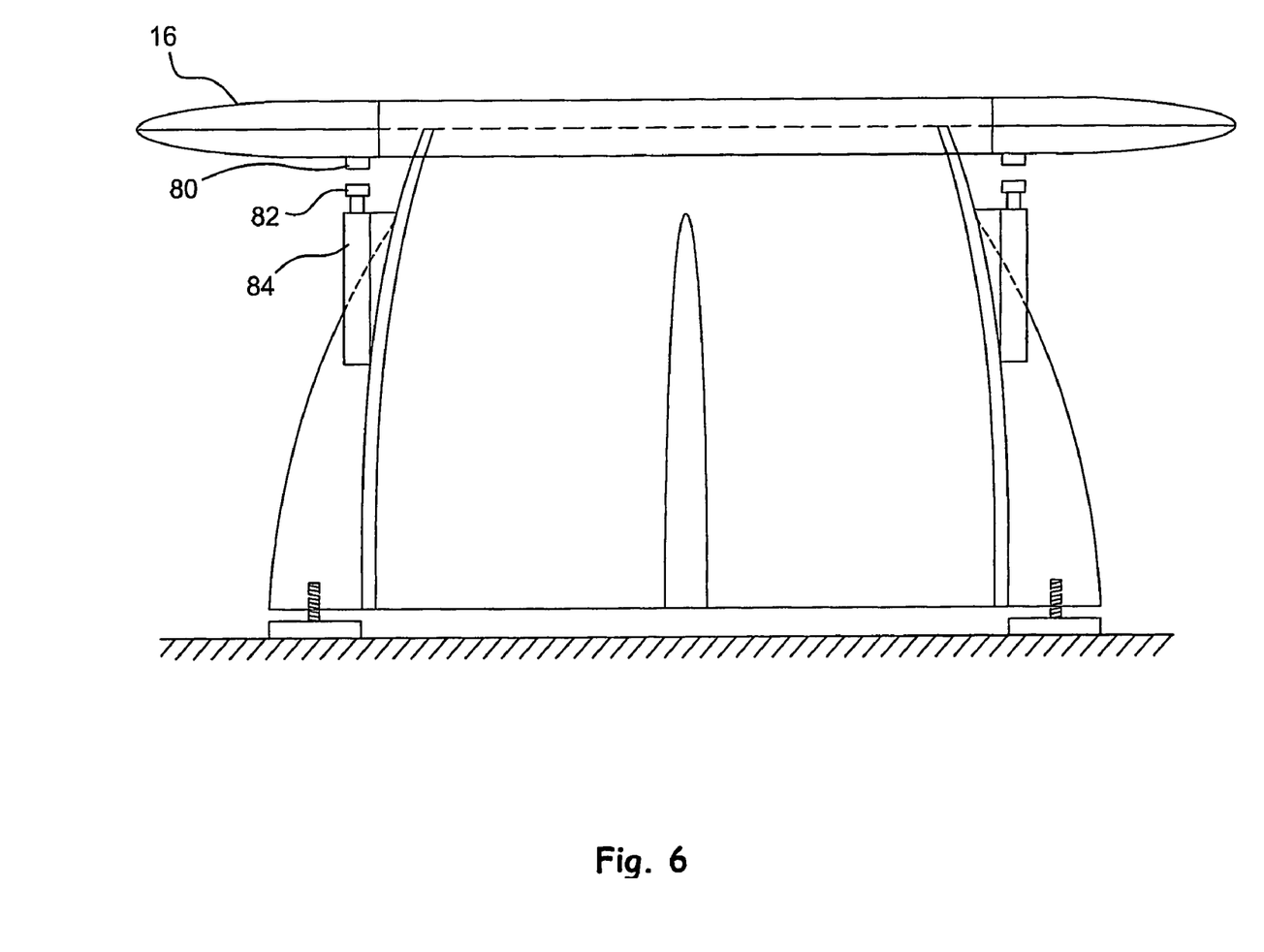
FIG. 6 is a side view of a third embodiment of the present invention.

FIG. 6 shows a device according to the present invention that includes magnets 80 for tuning the diaphragm. It is therefore an alternative to the weight-based tuning device illustrated in FIG. 2. Nevertheless both types of tuning mechanism could be used in the same device.

The magnets, or tensioning members, 80 are located on the underside of annulus 16. The magnets 80 are spaced equally around the annulus and are aligned with a similar number of moveable magnets 82, each being part of a magnet locating device 84, which magnet locating devices are mounted on the housing. The magnet locating devices 84 permit the distance or separation between each magnet 80 and the corresponding tensioning magnet 82 to be adjusted, so as to control the tension applied to the diaphragm.

Figure 7:
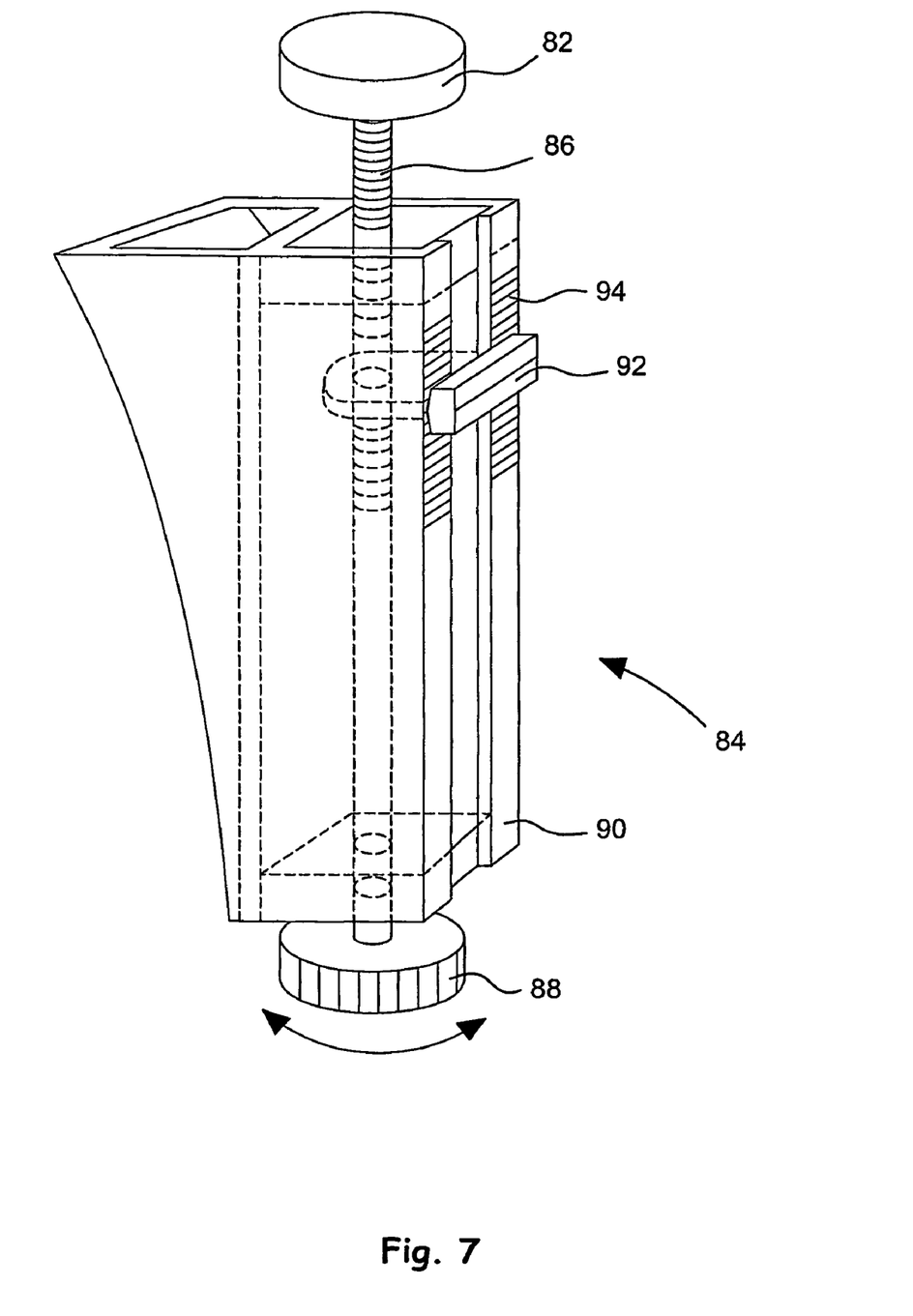
FIG. 7 is a perspective view of the tensioning device of FIG. 6.

FIG. 7 shows an example of magnet locating device 84. The tensioning magnet 82 is connected to a threaded shaft 86 which can be rotated by adjuster 88, which in this example takes the form of a bevelled wheel. Rotation of the wheel 88 causes the threaded shaft 86 to move up and down with respect to housing 90. A position marker 92 is associated with the threaded shaft and moves with the magnet 82. In this example the housing 90 is provided with markings or graticules 94 so that the position of the indicator 92 can be established, which assists with "fine tuning" of the diaphragm and enables the tuning to be reproduced, for example in accordance with tuning instructions.

These preferred embodiments have been described by way of example and it will be apparent to those skilled in the art that many alterations can be made that are still within the scope of the invention.

The invention claimed is:

1. An acoustic device for displaying modal patterns, the device having a housing and a diaphragm extending across the housing to define a closed chamber, the arrangement being such that when a mass of particulate matter is located on the diaphragm, excitation of the diaphragm by a sound source creates a pattern in the particulate matter thereon indicative of at least one property of the sound produced by the sound source, and at least one sound connecting means providing an air flow path between the closed chamber and the outside of the device, wherein valve means are associated with the or each sound connecting means, said valve means having a closed position in which air flow out of the chamber through the valve means is not possible and an open position in which air flow into the chamber through the valve means is possible.

2. An acoustic device according to claim 1, wherein the or each sound connecting means include an opening in the housing through which sound can pass into the chamber.

3. An acoustic device according to claim 1, wherein the valve means is biased to the closed position.

4. An acoustic device according to claim 1, wherein the valve means is located in the sound connecting means.

5. An acoustic device according to claim 1, wherein the valve means include a non-return valve.

6. An acoustic device according to claim 1, wherein the valve means include a resilient member attached to the sound connecting means.

7. An acoustic device according to claim 1, wherein there are at least two sound connecting means.

8. An acoustic device according to claim 7, wherein there are at least four sound connecting means.

9. An acoustic device according to claim 1, wherein the sound connecting means includes a tubular section.

10. An acoustic device according to claim 1, wherein the sound connecting means include an external member that extends outside the housing.

11. An acoustic device according to claim 10, wherein at least a part of the external member is flexible.

12. An acoustic device according to claim 10, wherein the external member is releasably attached to the device.

13. An acoustic device according to claim 1, wherein the sound connecting means includes a sound source engaging end adapted to be placed adjacent or against a sound source.

14. An acoustic device according to claim 13, wherein the sound source engaging end includes a mouthpiece into which a user can make vocal sound.

15. An acoustic device according to claim 14, wherein the mouthpiece is adapted to cover the mouth and nose of a user.

16. An acoustic device according to claim 1, wherein the sound connecting means includes an internal member that extends inside the chamber to deliver sound to a central region of the chamber.

17. An acoustic device according to claim 16, wherein the internal member includes an upturned end inside the chamber so that sound can be directed at the diaphragm.

18. An acoustic device according to claim 16, wherein the internal member is rigid.

19. An acoustic device according to claim 1, wherein the apparatus includes a mass of particulate matter located on the diaphragm.

20. A method of tuning a diaphragm in an acoustic device for displaying modal patterns in which device the diaphragm can be excited by a sound source so that patterns are created in particulate matter located on the diaphragm, which patterns are indicative of at least one property of the sound produced by the sound source, the method including the step of applying one or more weight means to the device so that the weight means are associated with the diaphragm at one or more of a plurality of circumferentially spaced locations around the diaphragm, whereby the weight exerted by the weight means stretches the diaphragm.

21. An acoustic device for displaying modal patterns, the device having a housing and a diaphragm extending across the housing to define a chamber, the arrangement being such that when a mass of particulate matter is located on the diaphragm excitation of the diaphragm by a sound source creates a pattern in the particulate matter indicative of at least one property of the sound produced by the sound source, wherein the device includes a plurality of weight locating means to which one or more weight means can be applied, the weight locating means being associated with the diaphragm at circumferentially spaced locations around the diaphragm, whereby the tension in the diaphragm can be adjusted to tune the diaphragm's response to the sound source by applying selected weight means to one or more of the weight locating means.

22. An acoustic device for displaying modal patterns, the device having a housing and a diaphragm extending across the housing to define a chamber, the arrangement being such that when a mass of particulate matter is located on the diaphragm, excitation of the diaphragm by a sound source creates a pattern in the particulate matter indicative of at least one property of the sound produced by the sound source, wherein the device includes a removable sound collector for delivering sound to the chamber, the sound collector having a connector end for connection to the housing and a collector end for placement adjacent to a sound source.

* * * * *